(12) United States Patent
Rudolfo Van Arragon et al.

(10) Patent No.: US 9,027,742 B2
(45) Date of Patent: May 12, 2015

(54) CONVEYOR SYSTEM WITH DIFFERENT APPLICATIONS AND ISOLATION OF THE CONVEYED PRODUCT IN RELATION TO THE DRIVE SYSTEM

(71) Applicants: Geraldo Rudolfo Van Arragon, Castro/Paraná (BR); Marcos Gonçalves Silva, Castro/Paraná (BR)

(72) Inventors: Geraldo Rudolfo Van Arragon, Castro/Paraná (BR); Marcos Gonçalves Silva, Castro/Paraná (BR)

(*) Notice: Subject to any disclaimer, the term of this patent is extended or adjusted under 35 U.S.C. 154(b) by 0 days.

(21) Appl. No.: 14/089,093

(22) Filed: Nov. 25, 2013

(65) Prior Publication Data

US 2014/0190794 A1 Jul. 10, 2014

(30) Foreign Application Priority Data

Jan. 7, 2013 (BR) .................. 20 2013 000320 0

(51) Int. Cl.
*B65G 19/00* (2006.01)
*B65G 19/14* (2006.01)
*B65G 65/40* (2006.01)

(52) U.S. Cl.
CPC ............... *B65G 19/14* (2013.01); *B65G 65/40* (2013.01); *B65G 2207/26* (2013.01)

(58) Field of Classification Search
USPC ......... 198/708, 709, 717, 719, 727, 728, 729, 198/735.1, 735.3
See application file for complete search history.

(56) References Cited

U.S. PATENT DOCUMENTS

| | | | | |
|---|---|---|---|---|
| 2,130,492 | A * | 9/1938 | Hapman | 198/716 |
| 4,051,948 | A | 10/1977 | Sackett, Sr. | |
| 4,493,413 | A * | 1/1985 | Harrell | 198/708 |
| 4,573,565 | A * | 3/1986 | Braun et al. | 198/719 |
| 4,821,866 | A * | 4/1989 | Melgaard | 198/494 |
| 4,961,492 | A * | 10/1990 | Wiseman et al. | 198/841 |
| 5,029,697 | A * | 7/1991 | McMillan et al. | 198/860.2 |
| 5,593,019 | A * | 1/1997 | Schlagel | 198/721 |
| 6,612,426 | B1 * | 9/2003 | Guerra et al. | 198/860.2 |
| 7,137,506 | B2 * | 11/2006 | Munoz-Guerra et al. | 198/860.2 |
| 7,506,753 | B2 * | 3/2009 | Munoz-Guerra et al. | 198/860.2 |
| 7,536,940 | B2 * | 5/2009 | Nakayama et al. | 83/401 |
| 8,770,388 | B1 * | 7/2014 | Chaon et al. | 198/728 |

* cited by examiner

*Primary Examiner* — Douglas Hess
(74) *Attorney, Agent, or Firm* — Cantor Colburn LLP

(57) ABSTRACT

"CONVEYOR SYSTEM WITH DIFFERENT APPLICATIONS AND ISOLATION OF THE CONVEYED PRODUCT IN RELATION TO THE DRIVE SYSTEM", is a conveyor for grains, seeds, fruit, granulated and ground products and similar products. The conveyor has different applications and isolates the product conveyed from the drive system. There are two or more tubes, and in each set of tubes there is a swivel with a drive system using roller chain, chain, cable, belt, et cetera. In this manner, the drive system is isolated from the product, avoiding mechanical damages, contamination, and also increasing the performance of the system.

6 Claims, 16 Drawing Sheets

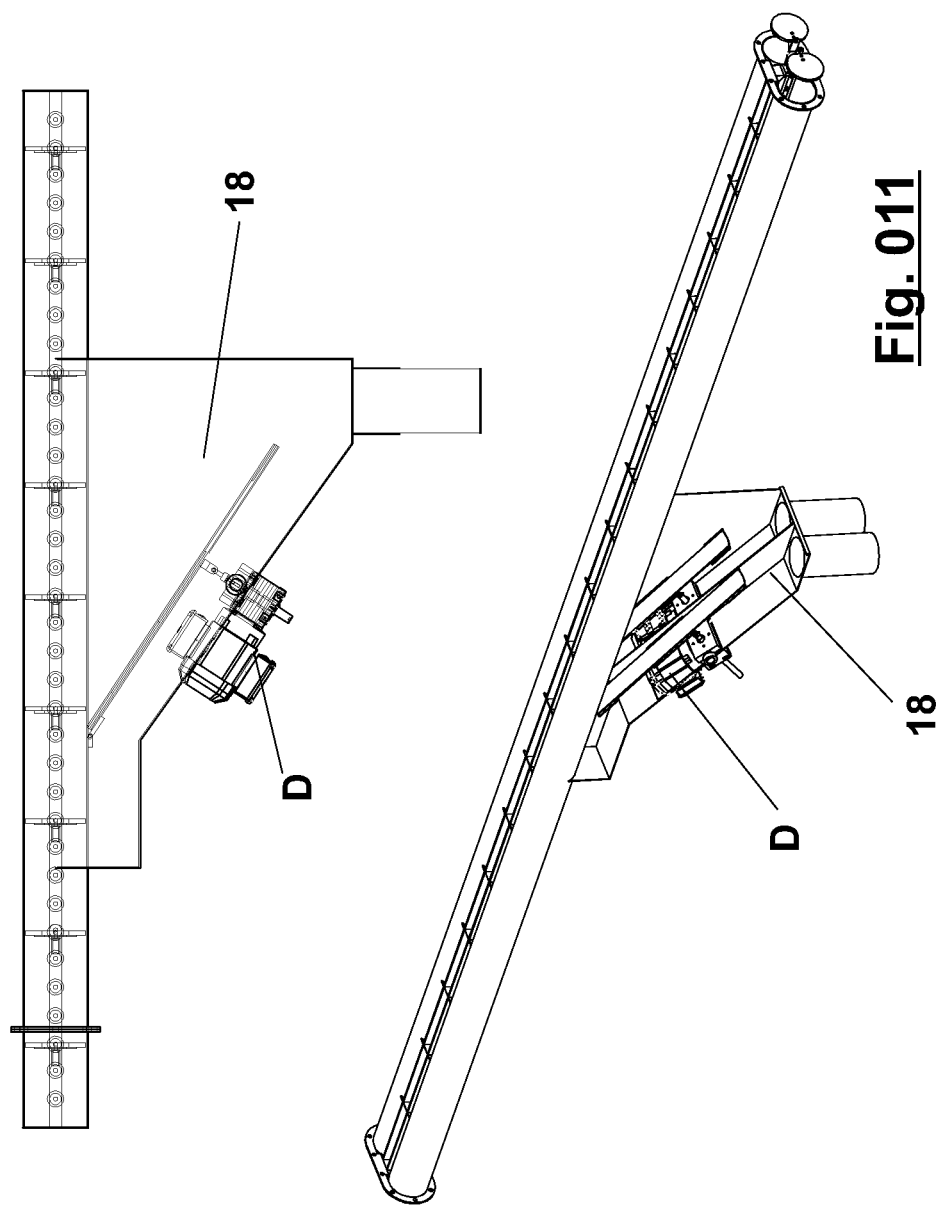

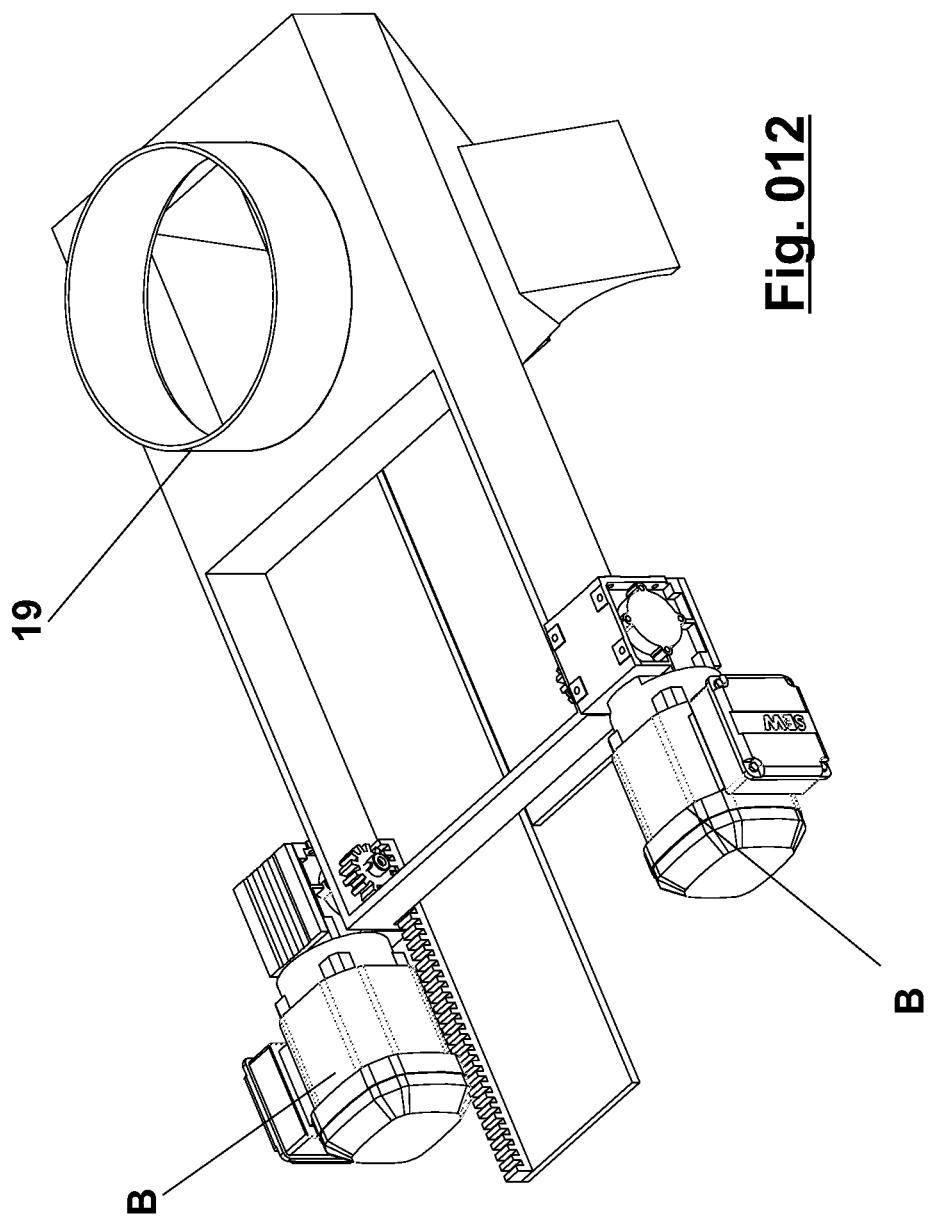

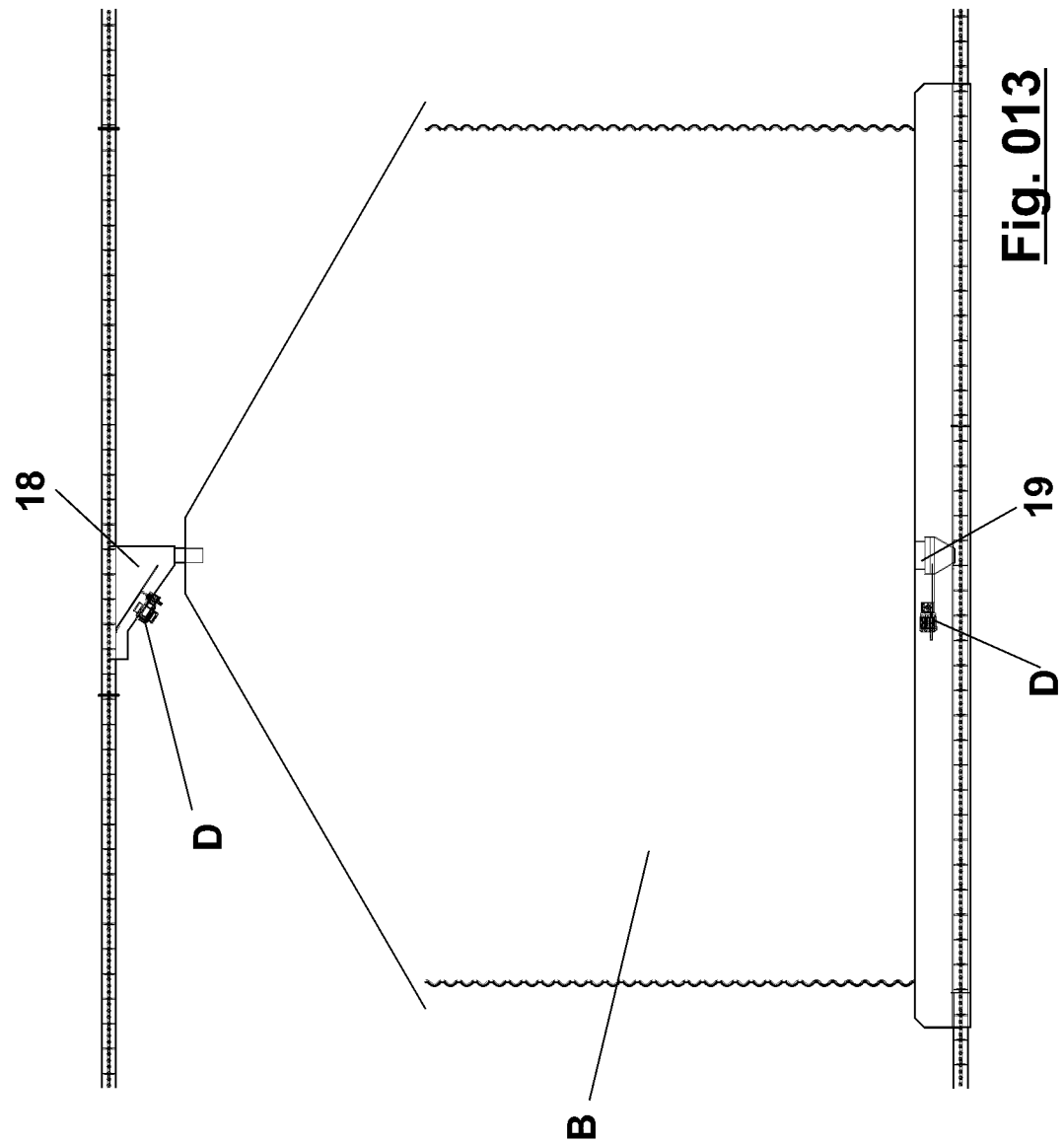

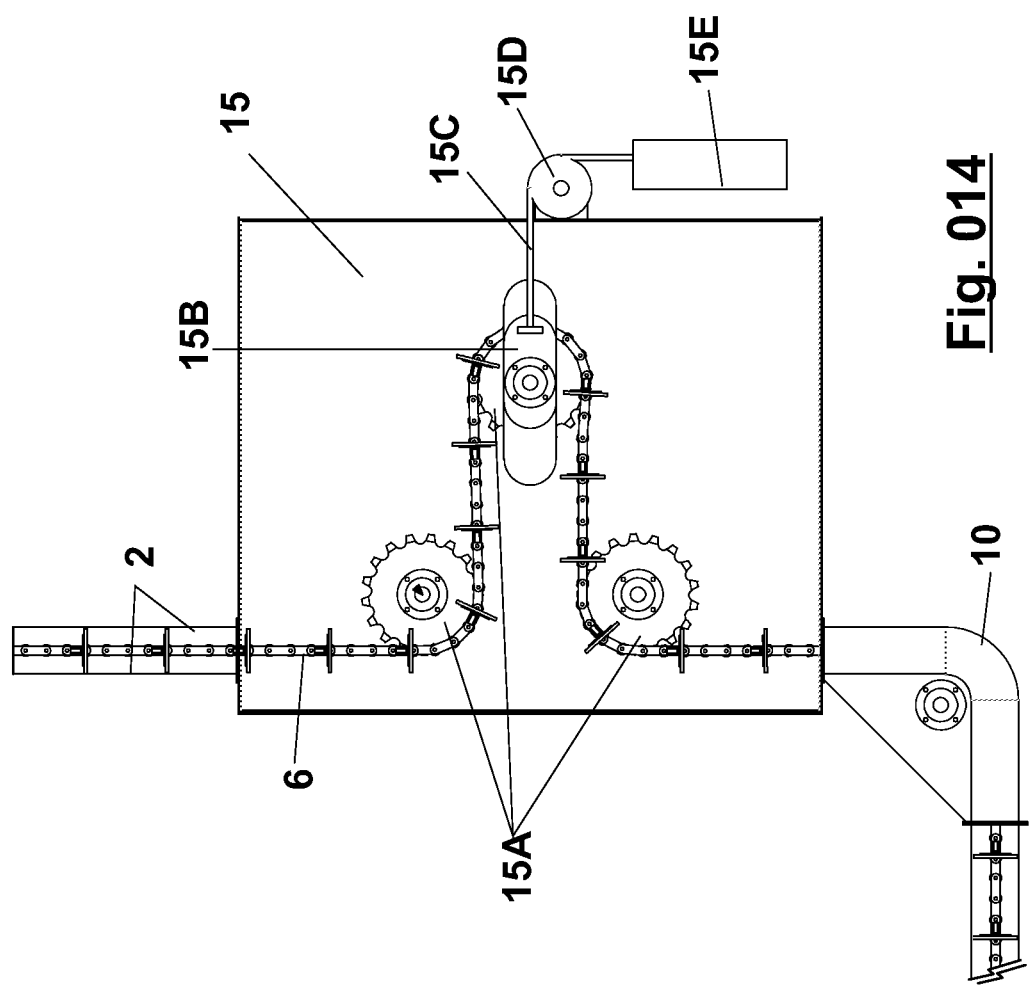

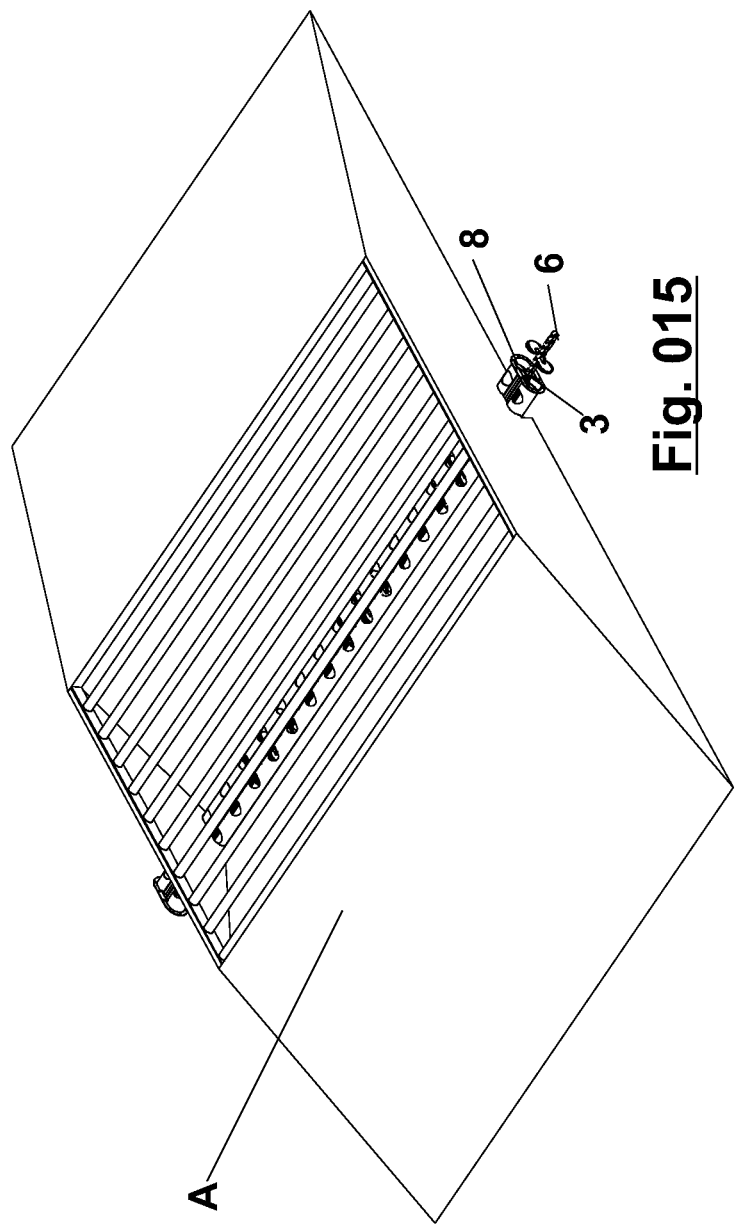

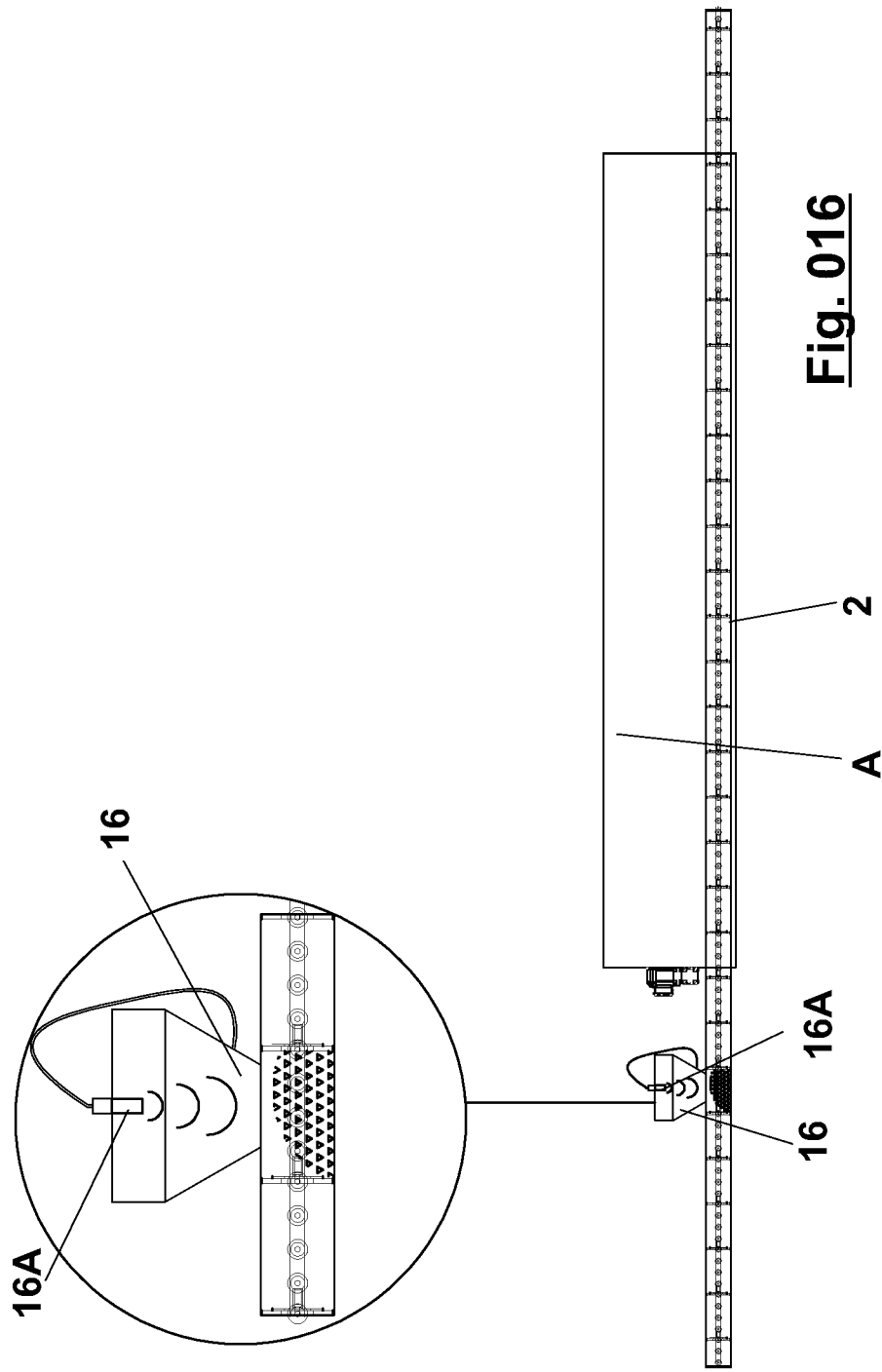

CONVEYOR SYSTEM WITH DIFFERENT APPLICATIONS AND ISOLATION OF THE CONVEYED PRODUCT IN RELATION TO THE DRIVE SYSTEM

CROSS REFERENCE TO RELATED APPLICATION

This application is related to and claims the benefit of Brazilian Patent Application Number 20 2013 000320 0 filed on 7 Jan. 2013, the contents of which said application are herein incorporated by reference in their entirety.

This is a conveyor system for grains, seeds, fruit, granulated and ground products and other similar products. The conveyor has different applications and isolates the product conveyed from the drive system. There are two or more tubes, and in each set of tubes there is a swivel with a drive system using roller chain, chain, cable, belt, et cetera. In this manner, the drive system is isolated from the product, avoiding mechanical damages, contamination, and also increasing the performance of the system.

STATE OF THE ART

The conventional systems show in their layouts the chain or similar piece invariable inserted in the conveyor conduits. This conveyance can be executed by a redler of squared or rectangular section, using a housing or belt, to name a few examples. The systems are used for conveyance of agricultural products such as grains, seeds, fruit, fertilizers and similar products. The systems can also have industrial use for conveyance of animal food, granulated and ground products.

The Brazilian Patent Invention PI1005540-1A2 entitled "Sistema de carga e descarga aplicado em transportador com duplo fluxo" (System of loading and unloading applied in conveyor of dual flow) and U.S. Pat. No. 4,051,948 "Dual Conveyor system" describe a dual conveyor, and in the interior of each conduit there is a chain with blades, which are in direct contact with the conveyed material.

Difficulties of the State of the Art

In the conventional systems, the drive system of the conveyor is located inside the conveyor conduits. This means that the friction of the products being conveyed with the elements of the mechanism of the drive/transmission system is responsible for mechanical damages. Besides, the drive system inside the conveyor duct reduces the area available for conveyance.

The conveyor systems suffer mechanical wear and tear, and mechanical residues end up being mixed with the products conveyed. Therefore, the conventional systems in bigger or less proportion end up contaminating the products. The levels of noise is also a problem because is extremely high, putting in risk the physical integrity of the people operating the system. When the level of the product is above the traction mechanism, i.e. chain, belt, et cetera, in the angles of the system, where the gear is usually located, the product ends up being thrown to the outside part of the main duct, in a chamber protecting the driving gear, or moved from the outside environment, causing mechanical damages and possible contamination of the product.

In other conveyor systems with open belt, the product is exposed to outside elements, and there is a risk of contamination by many natural agents found in the area.

Improvements Presented in the State of the Art

The innovative concept presented herein contributes to improve the efficiency, quality and versatility of conveyor systems, and it mends the deficiencies of conventional conveyor systems of agricultural and industrial usage, operations of conveyance, loading and unloading of many products such as seeds, fruit, grains, fertilizers, brans and similar products.

The embodiment herein presented shows as improvement and differentials a piece of equipment with drive system isolated from the conveyed product, which improves the efficiency of the system, avoids mechanical damage and contamination of the products conveyed by residues from the drive mechanism and from wear and tear of the mechanism.

Another advantage is the usage of only one chain for the simultaneous movement of the blades between the two conduits.

Disclosure of the Embodiment

The embodiment herein presented is a conveyor system for grains, seeds, fruit, grains, brans and similar products. The system comprises two or more conveyor conduits receiving the conveyance movement through the same drive system, located in the central part of the system. This drive system can be executed by roller chains, chains, cable or belt. The differential of this embodiment is the transmission/drive system being located outside the conduits which convey the products.

DESCRIPTION OF THE DRAWING FIGURES

The goals and advantages will become more apparent in light of the following descriptions:

FIG. 011 shows a lateral view and a perspective view of the discharge passageway of the conveyor system.

FIG. 012 shows a perspective view of the load mechanism of the conveyor system.

FIG. 013 shows a lateral view of the load and discharge passageway of the conveyor system.

FIG. 014 shows a lateral view of the tensioning chain system of the conveyor system.

FIG. 015 shows a perspective view of the hopper of the conveyor system.

FIG. 016 shows a lateral view and in detail of the hopper of the conveyor system.

DETAILED DESCRIPTION OF THE FIGURES

Figure 1:
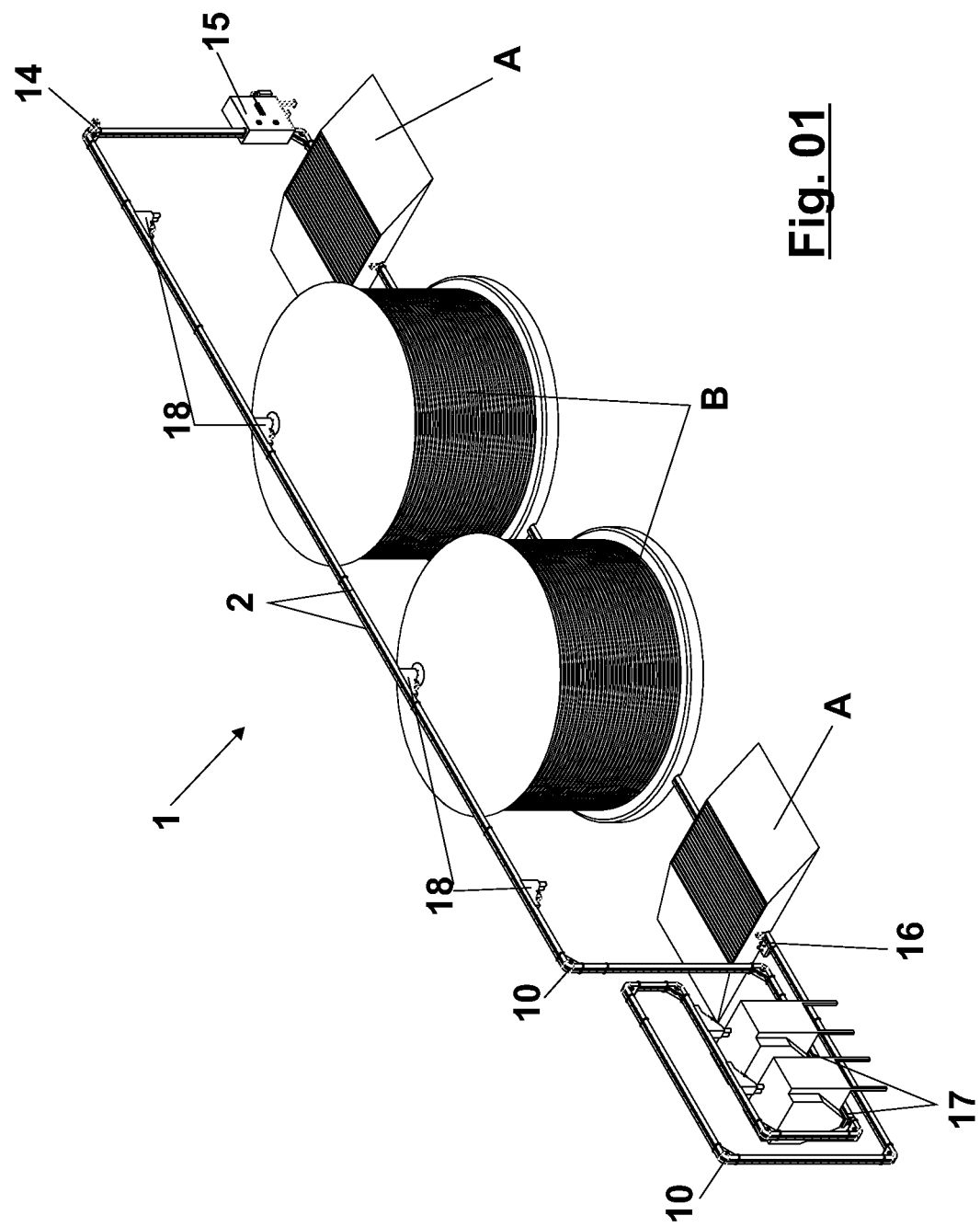
FIG. 01 shows in perspective the entire structure which comprises the conveyor system of many applications with isolation of the product from the drive system.

The conveyor system with different applications with isolation of the product in relation to the drive system is a conveyor (1) of grains, seeds, fruit, granulated and ground products with two or more conduits (2) in a close circuit. The conduits (2) receive the products from the hoppers (A) and distribute to the storage silos (B). The conveyor (1) has a drive and transmission system (3) located on the external part and free from contact with the products conveyed and between two conduits (2).

The conveyor (1) has two conduits (2) in closed circuit. The conduits (2) are united and welded parallel on their entire extension, by two U shaped beams (4) across front each other, and in their central wall (4A) there are two rulers or a nylon frame (5), used to avoid friction and noise of the transmission chains (6). The chains (6) are located symmetrically centered between the frames (5) and the conduits (2). The chain (6) has in its laterals many nylon sealing plates (7) and many drag sets (8) fixed in the extremities of its links, which slide freely in the interior of the conduits (2). Each drag set (8) has a triangular base (8A) which supports the oblong reinforcement (8B) of the drag circular insert (8C).

The conduits (2) are divided in blocks which are united by an oblong connection flange (9) located in the extremities of the conduits.

Each angle (10) of the conveyor (1) has a sprocket (11), which spins around a shaft (12) and a thrust bearing (13), which are positioned between two plates of triangular support (14) and the sprocket (11) is used for traction of the links of the chain (6).

The traction system (14) has a gearbox (14A), which starts the sprocket (11), located in one of the angles (10).

The conveyor (1) has an automatic tensioning system (15), with a set of three sprockets (15A). Each sprocket (15A) has a sliding central piece (15B), interconnected by a cable (15C), to a sheave (15D) and a counterweight (15E).

The transmission system may be by chain (6); roller chain; cables or belts.

Figure 2:
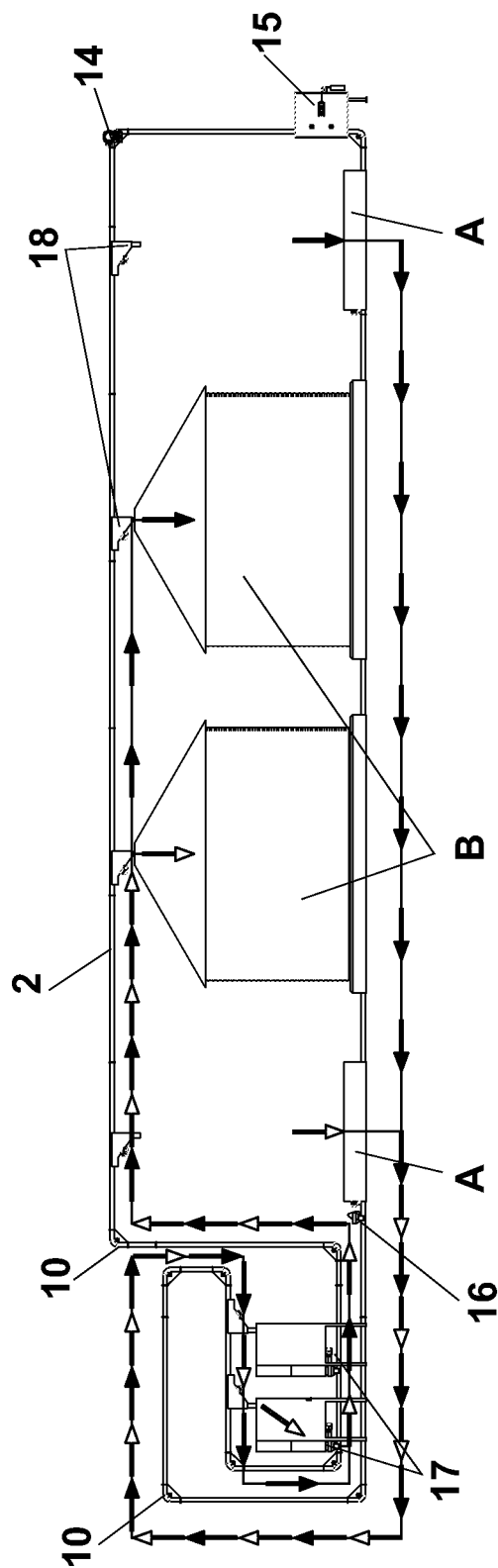
FIG. 02 shows a lateral and schematic view of the entire structure which comprises the conveyor system of many applications with isolation of the product from the drive system.

In FIGS. 01 and 02 the entire conveyor system (1) is pictured, and it also shows: both conduits (2) in closed circuit; the hoppers (A); the silos (B); the angles (10); the traction system (14); the automatic tensioning system (15); the flow regulating system (16); the automatic load passage system (17); the devices for automatic discharge passage (18); and load passage mechanism (19).

Figure 3:
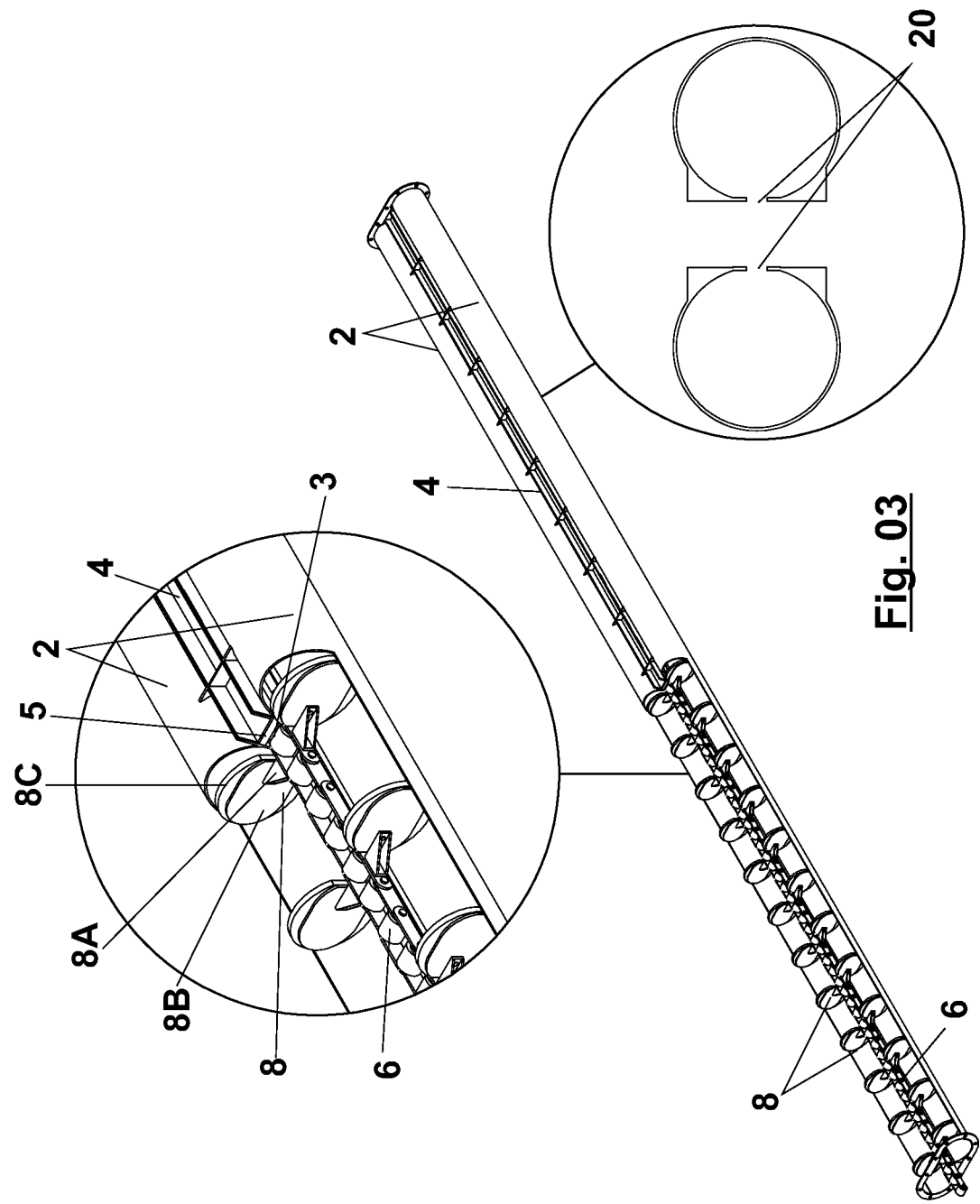
FIG. 03 shows a cross-section view of both conduits of the drive system.
Figure 4:
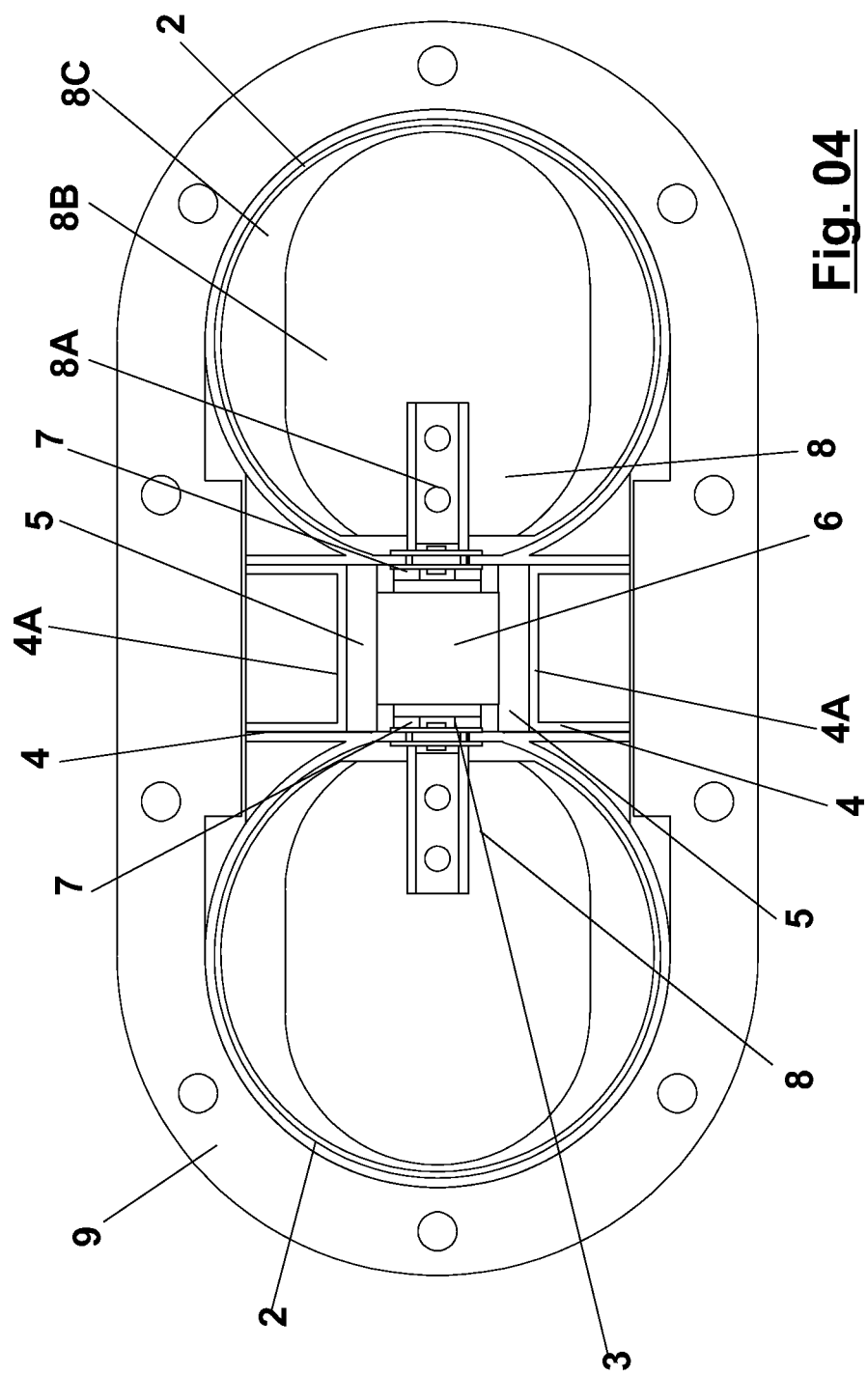
FIG. 04 shows a cross-section/transversal view of the conduits of the drive system.
Figure 5:
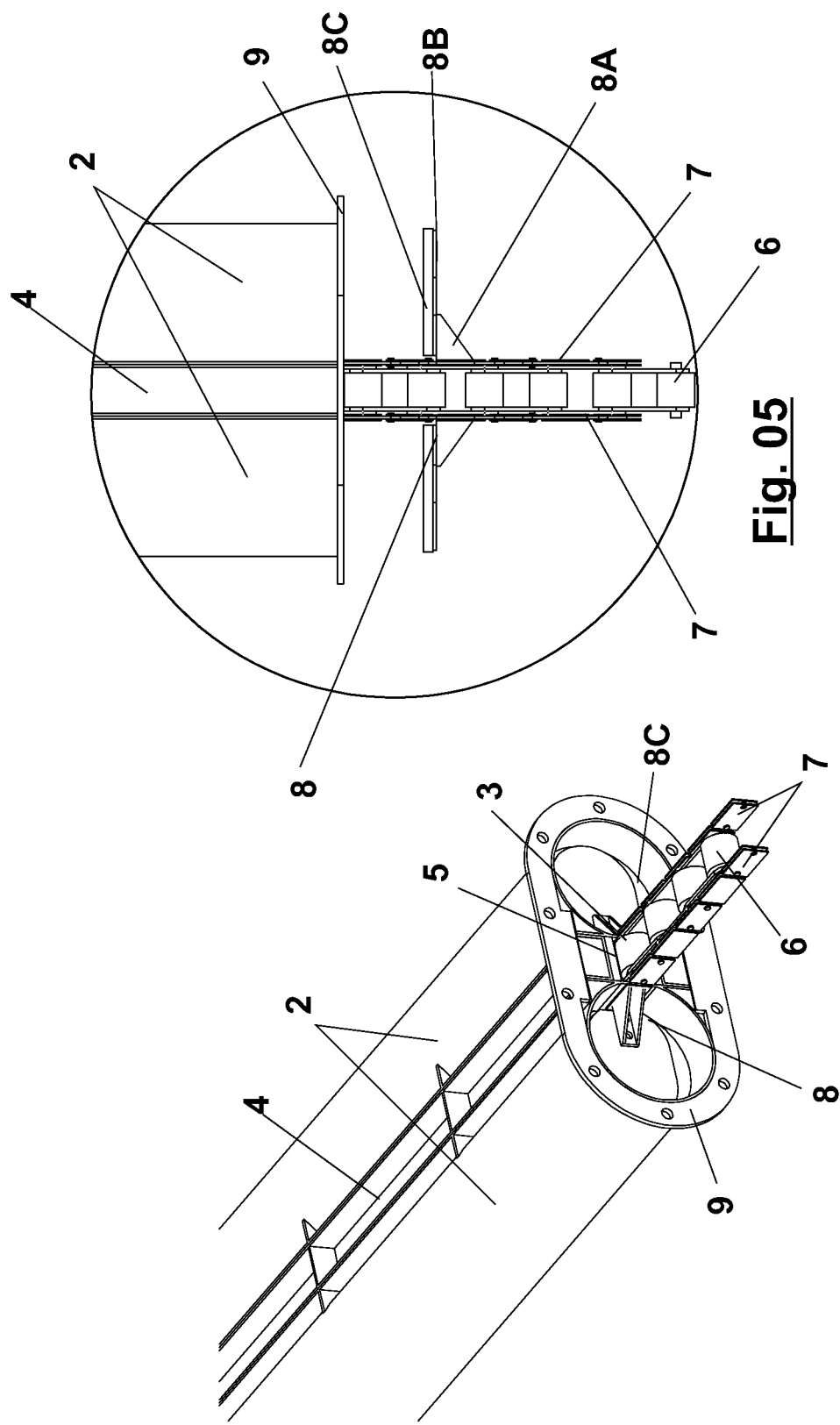
FIG. 05 shows in perspective and in details both conduits of the conveyor system.
Figure 6:
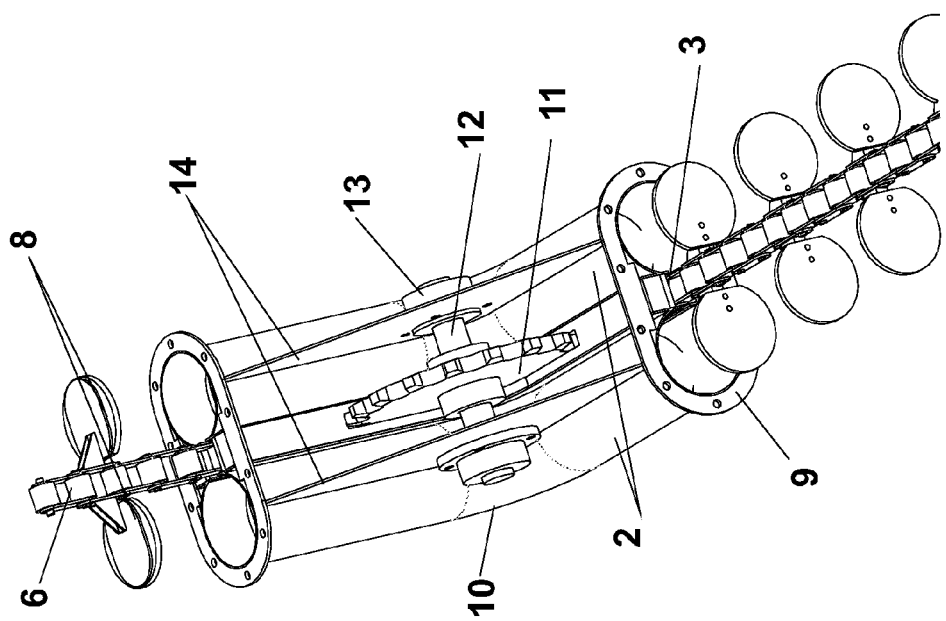
FIG. 06 shows in perspective the angles of both conduits of the conveyor system.
Figure 7:
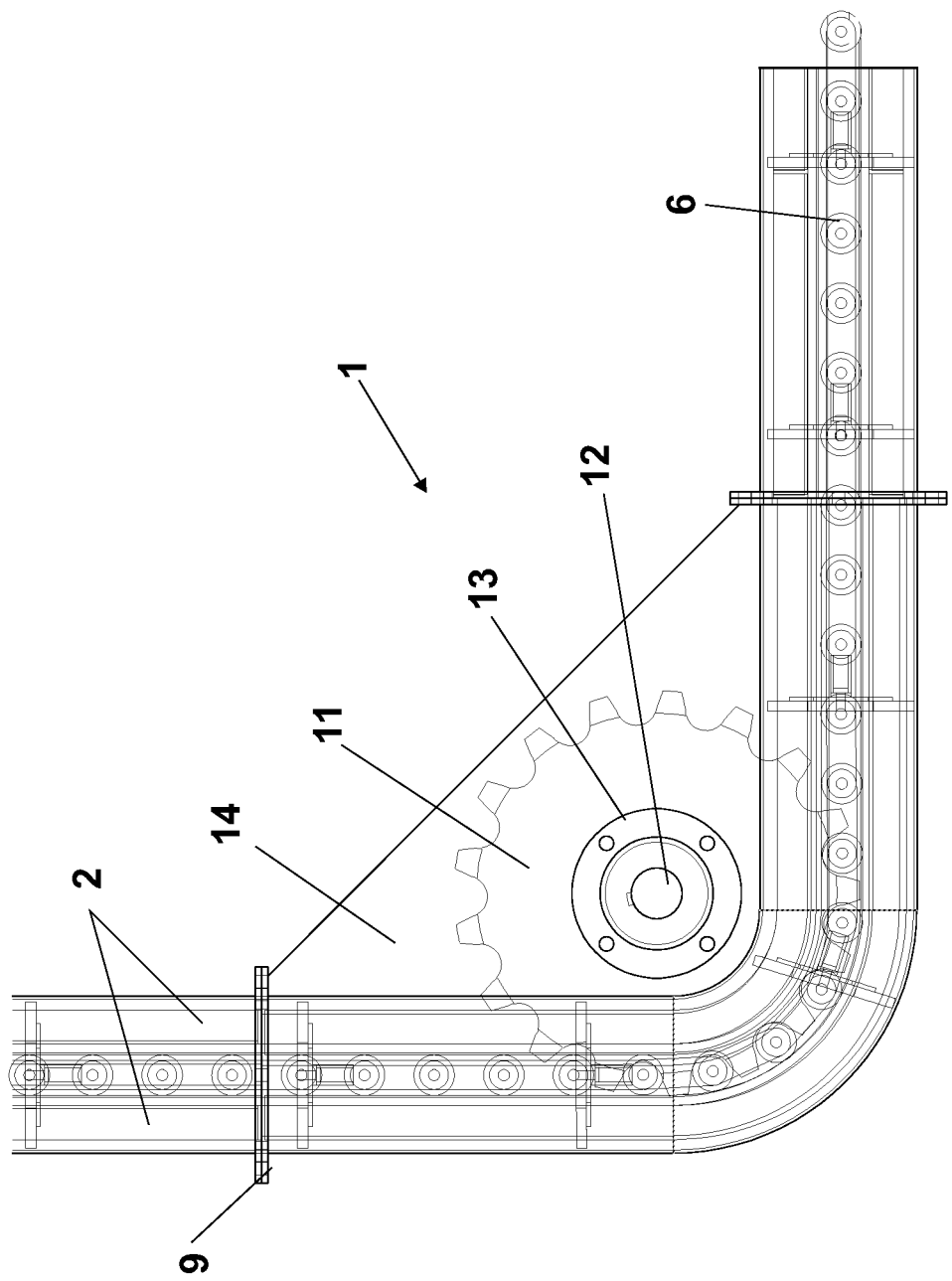
FIG. 07 shows a lateral view of the angle with the mechanism of the conveyor system.
Figure 8:
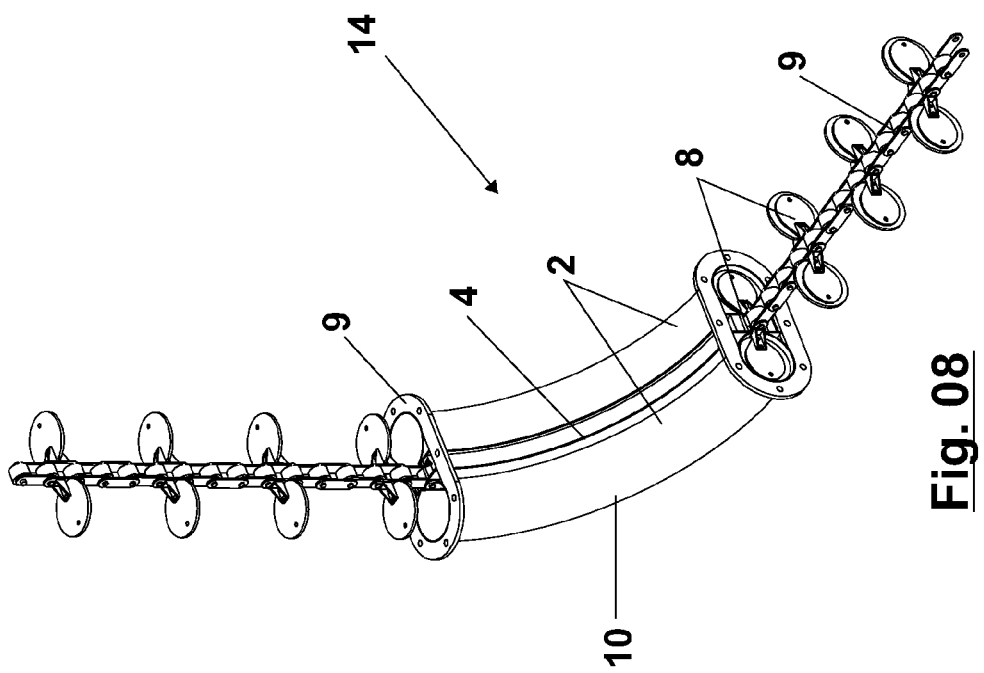
FIGS. 08 and 09 shows in perspective and lateral cross section of the conduits and angle of isolated passage for the products in the conveyor system.
Figure 9:
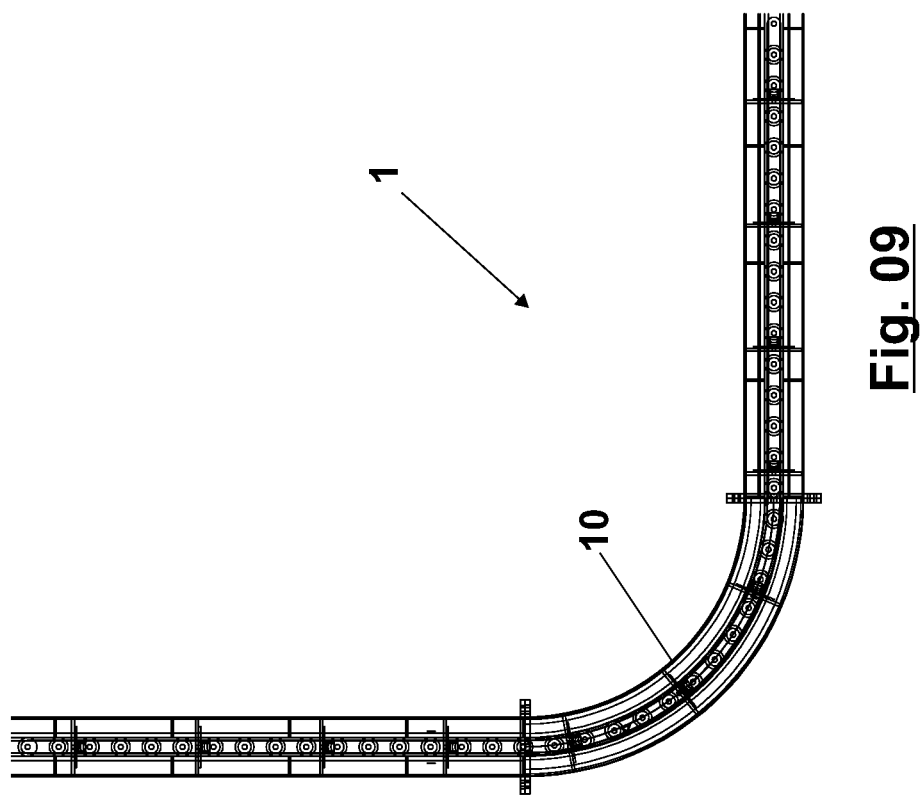

FIGS. 03, 04 and 05 show the ducts (2) and transmission system (3), and it also show: U shaped beams (4), with a central wall (4A); rulers or nylon frames (5); the transmission chain (6); the nylon sealing plates (7); the drag sets (8), with a triangular base (8A), the oblong reinforcement (8B) and the drag circular insert (8C); and the oblong connection flange (9). In these pictures it is showed the openings (20) of the internal section of the conduits (2).

These views show the detail of the chain (6) centered in the system, and isolated from the interior of the conduits (2), and the isolation system by using a mechanism of nylon sealing (7), fixed to the chain (6), perfectly sealing the opening on the interior part of the conduits (2) allowing the contact of the transmission with the movement of the inserts (8C) of transport. The system of friction and noise elimination caused by the chain has nylon frames (5) which are in contact with the rollers of the chains (6).

FIGS. 06, 07, 08 and 09 picture the angles (10) with and without the sprocket of the conveyor (1), and it also shows: the ducts (2) straight and arched; with the oblong connection flange (9); the transmission system (3), with the chain (6) and the drag sets (8); the U shaped beams (4); the sprocket (11); the shaft (12); the thrust bearing (13); and the plates of triangular support (14).

Figure 10:
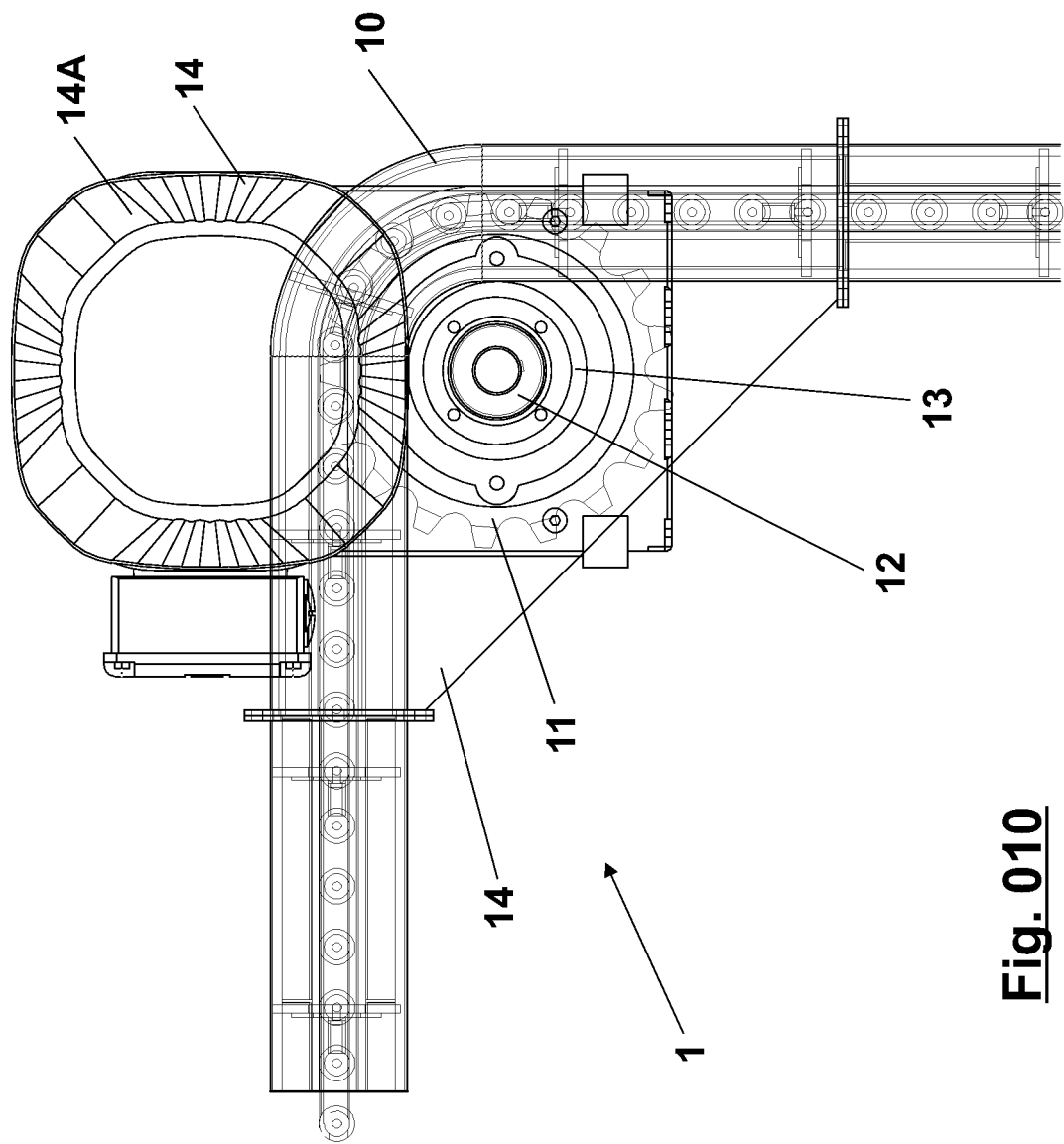
FIG. 010 shows a lateral view of the traction system of the conveyor.

FIG. 10 pictures the traction system (14), and it also shows the gearbox (14A), which triggers the sprocket (11), located in one of the angles (10). The traction system of the conveyor (1) is formed by a sprocket (11) or sheave attached to a shaft (12) and a gearbox (14A). The sprocket (11) transfers the movement to the chain/belt/roller chain (6) and depending on the configuration of the system, one or more gearbox (14A) is necessary, and must be always located at the angles (10). It is just a matter of right dimension for each option.

FIG. 011 shows the discharge passage mechanism (18) of the conveyor system with isolation of the drive system in relation to the conduit. In case of two conduits, each one has an independent opening system through motorization (D). The conduits have also an automated drive system, allowing each conduit to be independent from each other.

FIG. 012 shows a load passage mechanism (19) of the conveyor system with isolation of the drive system in relation to the conduit. It also shows that in case of two conduits each one has an independent opening system through motorization (D) independent for each conduit.

FIG. 13 shows the possibility of load (19) and discharge (18) passage application, in this case, in units of pre and post cleaning. The product is discharged in the passageway to the unit which processes the grains returning to the system through the load (19) passageway, until the product is at the top of the silos allowing the discharge in its interior, in the lower part the load passageway allows the reintroduction of the product in the system.

FIG. 014 shows a tensioning system of the chain (15), comprising of a set of three sprockets (15A), one of them having a sliding central piece (15B), interconnected by a cable (15C), to a sheave (15D) and a counterweight (15E), which promotes the tension by chain or steel cable of the transmission system by calculation of the dimension for each system.

FIGS. 015 and 016 shows the hopper (A), which receives the product discharged in bulk, sliding down to the conduit (2) system. The adjustment of discharge of the product is done by automatic flow control system (16), and by a sensor (16A) which detects the discharge of the product in each conduit (2), projected to increase the durability of the system, and avoiding operational errors.

Explanation about the Operation:

The activation of the conveyor system is by a sheave or sprocket (11) attached to a shaft (12) and a gearbox (14A). The sprocket (1) transfers the movement to the chain/belt/roller chain (6) and depending on the configuration of the system, one or more gearbox (14A) is necessary, and must be always located at the angles (10). It is just a matter of right dimension for each option. The angles (10) without motor pulleys, have a sprocket (11) attached to a shaft (12) which sustains the change of direction. This change is performed by sliding systems, which are the U shaped beams (4) coated with nylon (5). These two configurations are responsible for the change of direction of the roller chain (6).

Another differential of the system is the sling inserts (8C) which do not suffer dragging in the conveyor conduits (2) which is the case on conventional systems, because they are concentric to the conveyor conduits, for being suspended by the roller chain (6). This maintains the durability of inserts (8C), as well as the movement effort, diminishing the wear and tear of the conduit and saving energy.

In the lateral of the roller chains (6), a nylon sealing system is optional (7), which forms the opening (20) in the internal part of the conveyor conduits (2), interrupted only by triangular support (8A) of the inserts (8C) which on its own seals the interior of the conveyor conduit (2) protecting from the outside.

The contact of the roller chain (6), or by another drive system with the interior part of the conveyor conduit (2), is through a triangular support (8A) which is inserted in the tubes by an opening (20) in the internal part of the conveyor conduit (2).

In the interior of the conveyor conduit (2) the triangular support (8A) receives an oblong reinforcement (8B) for the circular transporting insert (8C) which receives the connection of the transporting inserts (8A), concentrically positioned forming the profile of the transport conduits (2). These inserts are responsible for the movement/transport of the product through the interior of the transport conduit (2), complementing the transporting mechanism with internal isolated drive of the conduit.

In the beginning of the process of the transportation the product is usually discharged in a hopper (A). Using this example, after the transport system is fed by the hopper (a) a level sensor is used (16A) which is attached to the transport conduit (2) making the product level inside the conduit correct for the operation performance.

Afterwards, the system can conduct the product to the pre cleaning system, silos 1 (B), silos 2 (B), among others. The discharge of the transport system in any one of these units of the system of transport/drying off/storage, is by a discharge passageway (18) and with the selector system controlled by CLP, giving the following discharge options. In case it is for two transport conduits (2) in the same drive system, these would be the options:

drawer number 1 closed and number 2 closed;
drawer number 1 open and number 2 closed;
drawer number 1 closed and number 2 open;
drawer number 1 open and number 2 open;

The structures above mentioned are not limited to the options above, after receiving and processing the product, they send the product through the load passageway (19) to the conveyor system. The load of the conveyor system in these units is through a load passageway (19) and with the selector system, controlled by CLP, giving the following load options. In case it is for two conduits of transport (2) in the same drive system:

drawer number 1 closed and number 2 closed;
drawer number 1 open and number 2 closed;
drawer number 1 closed and number 2 open;
drawer number 1 open and number 2 open;

At the end of the system there is a safe area which should not be used for transport, in any circumstance. In this region the tightening system (15) of the roller chain (6) is located. The tightening system (15) maintains the tension of the system in a good level, avoiding the sliding of the transmission in the motor sprocket, and keeping the synchrony of the system.

The invention claimed is:

1. "CONVEYOR SYSTEM WITH DIFFERENT APPLICATIONS AND ISOLATION OF A CONVEYED PRODUCT IN RELATION TO A DRIVE SYSTEM", comprising:
a conveyor of grains, seeds, fruit, granulated and ground products and similar products;
two or more conduits in a closed circuit configured to receive the product from hoppers and distribute to storage silos;
a transmission and drive system, disposed between the two conduits, wherein, the transmission and drive system is on an outside and does not make contact with the products transported;
wherein the conveyor includes two or more conduits in a closed circuit, united and welded parallel on their entire extension by two U-shaped beams across a front of each other, wherein in a central wall, there are two rulers or a nylon frame, used to avoid friction and noise of transmission chains located symmetrically centered between the frames and the conduits, wherein each chain includes nylon sealing plates and further includes, fixed in extremities of its links, many drag sets, which slide freely in an interior of the conduits, wherein each drag set has a triangular base which supports an oblong reinforcement of a drag circular insert.

2. "CONVEYOR SYSTEM WITH DIFFERENT APPLICATIONS AND ISOLATION OF THE CONVEYED PRODUCT IN RELATION TO THE DRIVE SYSTEM" according to claim 1 wherein the conduits are divided in blocks which are united by an oblong connection flange located at extremities of the conduits.

3. "CONVEYOR SYSTEM WITH DIFFERENT APPLICATIONS AND ISOLATION OF THE CONVEYED PRODUCT IN RELATION TO THE DRIVE SYSTEM" according to claim 1 wherein each angle of the conveyor has a sprocket, which spins around a shaft and a thrust bearing, wherein these three pieces are positioned between two plates of a triangular support and the sprocket is used for traction of the links of the chain.

4. "CONVEYOR SYSTEM WITH DIFFERENT APPLICATIONS AND ISOLATION OF THE CONVEYED PRODUCT IN RELATION TO THE DRIVE SYSTEM" according to claim 1 wherein the traction system has a gearbox, which starts the sprocket, located in one of the angles.

5. "CONVEYOR SYSTEM WITH DIFFERENT APPLICATIONS AND ISOLATION OF THE CONVEYED PRODUCT IN RELATION TO THE DRIVE SYSTEM" according to claim 1 wherein the conveyor has an automatic tensioning system, with a set of three sprockets, wherein each sprocket has a sliding central piece, interconnected by a cable, to a sheave and a counterweight.

6. "CONVEYOR SYSTEM WITH DIFFERENT APPLICATIONS AND ISOLATION OF THE CONVEYED PRODUCT IN RELATION TO THE DRIVE SYSTEM" according to claim 1 wherein the transmission system is by chain; roller chain; cables or belts.

* * * * *